No. 736,682. PATENTED AUG. 18, 1903.
E. J. BROOKS.
SNAP SEAL.
APPLICATION FILED MAY 28, 1903.
NO MODEL. 2 SHEETS—SHEET 1.
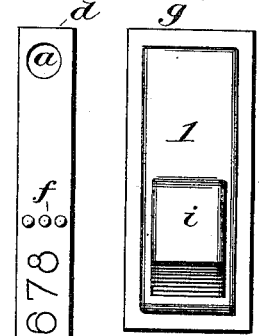
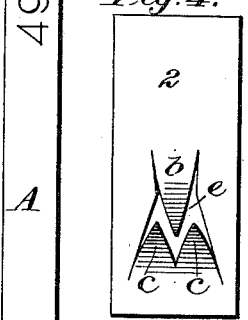
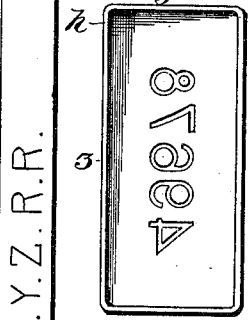
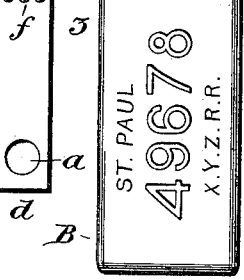
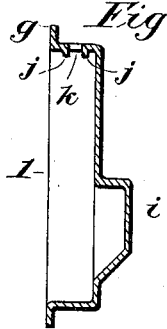
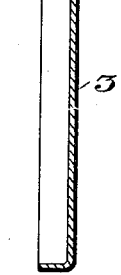
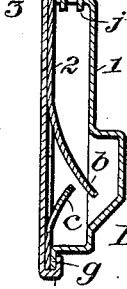
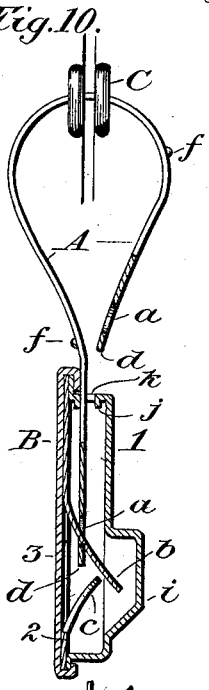
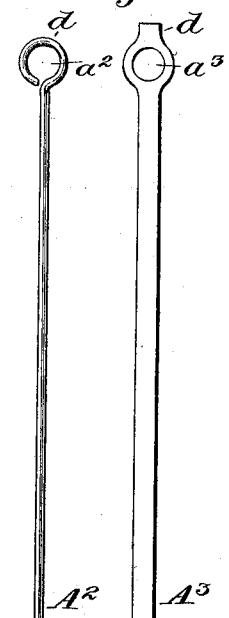
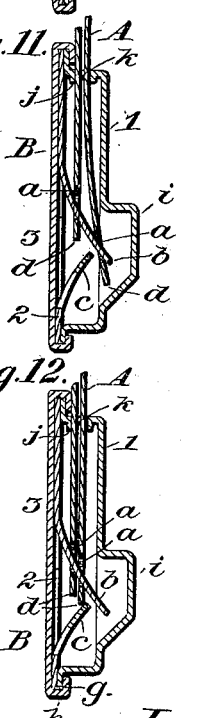
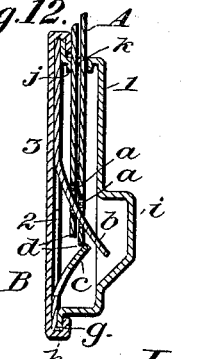
Witnesses:
Geo. E. Gawett
E. Thos. Loftus
Inventor:
Edward J. Brooks
by his attorney No. 736,682. PATENTED AUG. 18, 1903.
E. J. BROOKS.
SNAP SEAL.
APPLICATION FILED MAY 28, 1903.
NO MODEL. 2 SHEETS—SHEET 2.
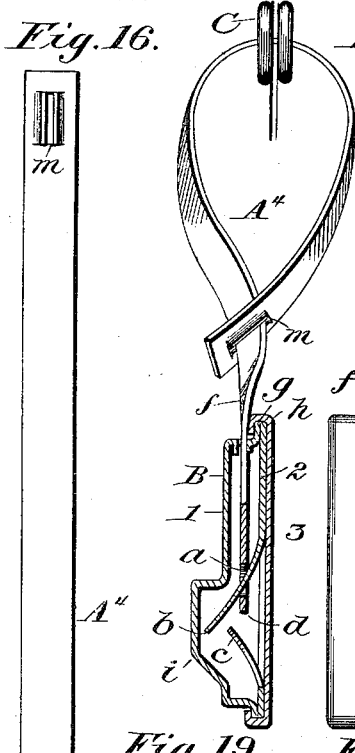
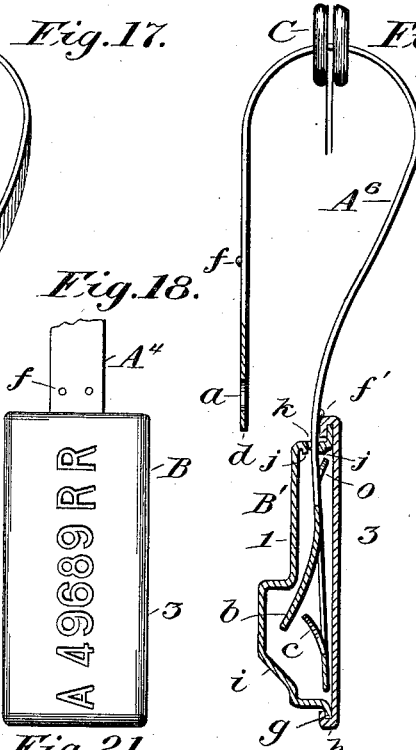
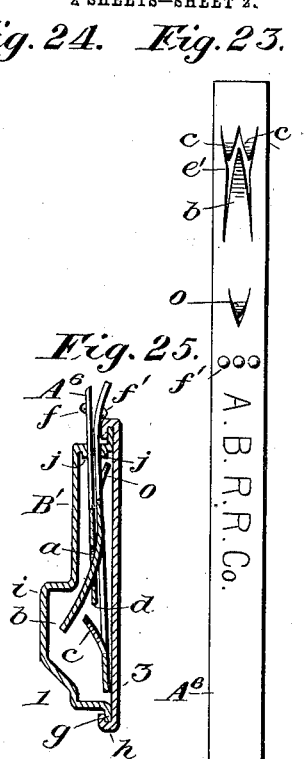
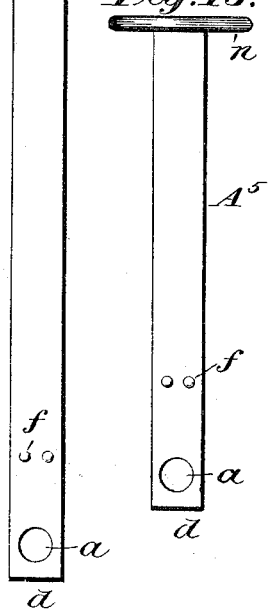
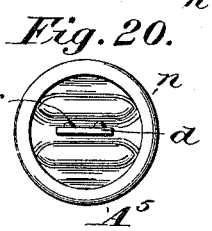
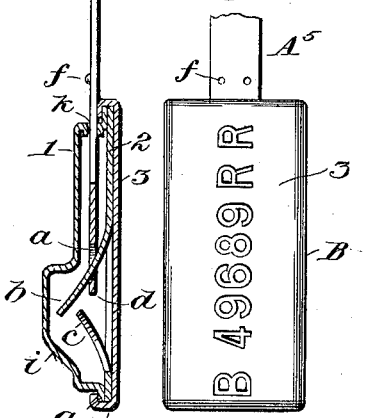
Witnesses:
Geo. E. Garrett
E. Thos. Loftus
Inventor:
Edward J. Brooks
by his attorney No. 736,682.

Patented August 18, 1903.

UNITED STATES PATENT OFFICE.

EDWARD J. BROOKS, OF EAST ORANGE, NEW JERSEY.

SNAP-SEAL.

SPECIFICATION forming part of Letters Patent No. 736,682, dated August 18, 1903.

Application filed May 28, 1903. Serial No. 159,193. (No model.)

*To all whom it may concern:*

Be it known that I, EDWARD J. BROOKS, a citizen of the United States of America, and a resident of East Orange, in the State of New Jersey, have invented a new and useful Improvement in Snap-Seals, of which the following is a specification.

This invention relates, in common with previous improvements, to self-fastening seals, or "snap-seals," as they are commonly termed, for use as substitutes for lead and wire seals and other press-fastened sealing devices to secure the doors of railway freight-cars and for other like purposes. Examples of such snap-seals are set forth in my specification forming part of United States Letters Patent No. 696,002, dated March 25, 1902, and in my previous specifications therein referred to. The present invention is more particularly an improvement on the sheet-metal snap-seal shown on Sheet 2 of the drawings of said Letters Patent No. 696,002. The distinguishing characteristic of that seal is a catch-carrying "middle piece," the body of which is permanently flat, so as to be securely held in place by the seam, which inseparably unites the principal pieces, between the body-piece and cap-piece of the sheet-metal seal part and substantially parallel therewith, and which is thus adapted to be made of thin and light spring metal, being wholly concealed from view and inaccessible except through the single inlet-hole of the seal part.

The leading object of the present invention is to produce a highly-efficient double or triple snap-catch adapted to be formed at a single punching operation in a flat middle piece for the seal part or in one end of a sheet-metal shackle made of sufficiently resilient material.

Two sheets of drawings accompany this specification as a part thereof.

Figure 1 is a face view of a flexible sheet-metal shackle for one of the improved seals. Figs. 2 and 3 are respectively a face view and a longitudinal section of the body-piece of a seal part for the same. Figs. 4 and 5 are respectively a face view and a longitudinal section of the middle piece. Figs. 6 and 7 are respectively a back view and a longitudinal section of the cap-piece. Figs. 8 and 9 are respectively a face view and a longitudinal section of the completed seal part. Fig. 10 is a sectional elevation showing a sectional edge view of the improved seal with one end of the shackle fastened and the other threaded through a pair of car-door staples preliminary to the final fastening operation. Figs. 11 and 12 are sectional edge views illustrating the fastening operation. Figs. 13 and 14 are elevations, respectively, of shackles of round and flat wire which may be used in the improved seal; and Fig. 15 is a face view of a middle piece of a different shape, illustrating modifications. Fig. 16 is a face view of another form of sheet-metal shackle. Fig. 17 is an elevation, partly in section, showing the same looped to a pair of car-door staples and interlocked with the improved seal part. Fig. 18 is a fragmentary face view projected from Fig. 17. Fig. 19 is an elevation of a bolt-shaped shackle adapted to interlock with the improved seal part. Fig. 20 is an end view thereof. Figs. 21 and 22 are sectional and face views showing said bolt-shaped shackle interlocked with the improved seal part. Fig. 23 is a face view of a sheet-metal shackle provided at one end with the improved double or triple snap-catch and having its other end adapted to interlock therewith. Fig. 24 is an elevation, partly in section, showing the shackle last named with its snap-catch end fastened within the seal part and ready for the final fastening operation; and Fig. 25 is a reproduction of the lower part of Fig. 24, showing the two shackle ends interlocked with each other.

Like reference characters refer to like parts in all the figures.

The improved snap-seal in all its forms is composed of a flexible shackle A or $A^2$, or $A^3$ or $A^4$, or $A^5$ or $A^6$ and a hollow seal part B or B', the latter in all cases of sheet metal, and is designed and adapted to be used in connection with a pair of car-door staples C or C' or the like in customary manner to insure the detection of any unauthorized opening of a railway-car or other receptacle.

The shackle is in all cases provided at one or each end with a catch-hole $a$ or with an equivalent loop $a^2$ or $a^3$, and such catch-hole or loop interlocks within the seal part with a double or triple snap-catch of peculiar construction of one and the same form in all the species. The distinguishing characteristics of such double or triple snap-catch, hereinafter termed "double," are the provision of one and the same flat portion of resilient sheet metal with an inclined main catch $b$ to resist the withdrawal of the shackle end interlocked therewith and a pair of secondary catches $c\ c$, projecting at the sides of the free end of said main catch to interlock with the extremity $d$ of the shackle end when the latter is pulled into engagement with the main catch and to prevent the disengagement of the catch-hole or loop of said shackle end from said main catch, all three catches being adapted to be formed at one and the same punching operation by a substantially M-shaped incision $e$ or $e'$ and all the catches projecting on one and the same side of said resilient catch portion.

In the leading species (represented by Figs. 1 to 12, inclusive) the shackle A is of sheet metal and is provided at its respective extremities with a pair of said catch-holes $a$, embossed guards $f$ adjacent to the respective catch-holes, and with a serial number "49678" and appropriate lettering "X. Z. Y. R. R.," and is adapted to be provided with all these features before or in the act of severing it in the shape of the customary rectangular strip from a sheet of tin-plate or other suitable metal. The seal part B of said leading species is composed of a body-piece 1, (shown detached in complete form by Figs. 2 and 3,) a middle piece 2, (shown detached by Figs. 4 and 5,) and a cap-piece 3, (shown by Figs. 6 and 7 as it appears before being assembled.) When these parts are assembled, as in Figs. 8 to 12, inclusive, a circumferential flange $g$ of the body-piece 1 rests against the margin of the middle piece 2, and the cap-piece 3 rests against the middle piece 2 on its other side, and its crown-flange $h$ is turned down over said circumferential flange $g$ of the body-piece 1, so as to inseparably and rigidly unite the parts with each other. A raised portion $i$ of suitable shape on the body-piece 1 accommodates within it the extremity of the main catch $b$ of the middle piece 2 near the lower end of the seal part B, and inturned rigid lips $j$ at the upper end of the seal part are separated by its inlet-hole $k$ and formed in the act of punching the latter in the end of the body-piece 1 and parallel with its circumferential flange $g$. The face of the seal part B, formed by said cap-piece 3, is preferably and conveniently provided with suitable distinguishing marks, (represented in Figs. 6 and 8,) "St. Paul, 49678, X. Z. Y. R. R." As indicated by a comparison of Figs. 6 and 8, the serial number may be embossed and the remainder of the lettering printed on the face of the seal part by means of a rubber stamp or the like. The distinguishing lettering may instead be embossed or printed and the serial number stamped, if preferred, or the seal part may be provided with both in either or any approved way.

Either end of the shackle A is inserted in the inlet-hole $k$ of the seal part B at the factory and permanently interlocked with the seal part B, as shown at the bottom in Fig. 10. In use the free end of the shackle A is next passed through a pair of car-door staples C or the like, as shown in Fig. 10, and is then inserted through the inlet-hole $k$ of the seal part B and fastened, as illustrated by Figs. 11 and 12. At the fastening operation the shackle end freely enters the inlet-hole and coming in contact with the main catch $b$ presses the latter out of its path until the catch-hole $a$ in the shackle end reaches the extremity of said main catch, when the latter springs through the catch-hole, as in Fig. 11. As illustrated by this figure, said main catch $b$ deflects the entering shackle end, so that it passes the extremities of the supplemental catches $c$. When the shackle is pulled to ascertain whether or not it is fastened, the shackle end slides into its fastened position on the main catch $b$ and in doing so passes the extremities of the supplemental catches $c$, as in Fig. 12, and by means of said supplemental catches is fastened on the main catch $b$, so as to render it impossible to disengage the catch-hole from said main catch by any movements of which the shackle end is capable within the seal part.

In the fastened seal, Fig. 12, the "guards" $f$ serve primarily to indicate the original shackle ends, so as to insure detection in case the shackle is cut and refastened. For this purpose the embossed form, adapted to be made only at the factory and there to be formed simultaneously with the lettering and serial numbers, is preferred. Such guards $f$ serve also as inlet-guards by so locating them that they are in the inlet $k$ or so close thereto as to prevent the insertion of a tampering instrument when the catch-hole $a$ is at or near the extremity of the main catch $b$ within the seal part.

With a shackle $A^2$ or $A^3$ of round or flat wire, as represented by Figs. 13 and 14, the seal part B would or might be of identically the same construction as in said first species, except that it would be rendered capable of reduction in size to a minimum, and a very light and inexpensive seal could be thus made. The two loops $a^2$ or $a^3$ of either of said shackles $A^2$ and $A^3$ would interlock successively with the main and supplemental catches $b$ and $c$ of the middle piece 2 of the seal part B in identically the same manner as the catch-holes $a$ of the sheet-metal shackle A in said first species. The adaptation of the seal part to carry any required lettering or distinguishing marks, as in Fig. 8, renders it unnecessary that the shackle and seal part should both be of sheet metal or its equivalent.

Fig. 15 represents a spring-metal middle piece $2^b$, round instead of rectangular in shape, but otherwise identical with the middle piece 2 of the seal part B of said first species, and is intended to indicate that the seal part as a whole may be round or of other shapes, if preferred. The shackle to be used in connection with the modified seal may be of any of the forms above described or either of those represented by Figs. 16 and 19, as hereinafter described.

In the species represented by Figs. 16, 17, and 18 the improved seal is composed of a sheet-metal shackle A⁴, adapted to be looped at one end to the car-door staples C or their equivalent, as in Fig. 17, and a seal part B, which is or may be identical with the seal part B of said first species, which interlocks with the other end of the shackle A⁴.

The loop end of the shackle A⁴ is provided with a longitudinal slot m, the metal therefrom being preferably displaced in the form of lips, as shown in Figs. 16 and 17. The other end of the shackle may be and preferably is identical with either end of the shackle A of the first species—that is to say, provided with a catch-hole a near the extremity d of the shackle end, with or without guards f to indicate the original extremity. The shackle A⁴ may be blank, as shown, or may be provided with any desired lettering or distinguishing marks corresponding with or supplemental to those "A 49689 R. R." of the seal part B, as represented in Fig. 18.

The shackle A⁴ is looped to the car-door staples C or their equivalent, and the free shackle end is then inserted into the seal part B through its inlet-hole k and interlocks with the main catch b and supplemental catches c, as shown in Fig. 17, which completes the fastening operation.

In the species represented by Figs. 19 to 22, inclusive, the shackle A⁵ is of the bolt shape set forth and claimed in my specification forming part of United States Letters Patent No. 719,642, dated February 3, 1903, having a sheet-metal stop-disk n at one end. Its other end may be and preferably is identical with either end of the shackle A of said first species—that is to say, provided with a catch-hole a near the extremity d of the shackle end, with or without guards f—and the seal part B is or may be identical with that of said first species. It is so shown in Figs. 21 and 22 with other lettering or distinguishing marks "B 49689 R. R." The bolt-shaped shackle is passed through a pair of car-door staples C', Fig. 21, or their equivalent and interlocks therewith by a said stop-disk n at one end thereof. Its other end is then inserted through the inlet-hole k of the seal part B and interlocks successively with the main catch b and supplemental catches c of the middle piece, as in Fig. 21, which completes the fastening operation.

In the species represented by Figs. 23 to 25, inclusive, the shackle A⁶ is of sheet metal and combines the functions of the shackle A and the seal part middle piece 2 of the first species. Said middle piece is, in effect, formed on one end of the shackle, the same being its upper end in Fig. 23, and comprises there, as elsewhere, a central inclined main catch b and a pair of supplemental catches c, projecting in an opposite direction as compared with said main catch and situated at the sides of the free end of said main catch, the whole being adapted to be formed by a substantially M-shaped incision e' in the sheet metal. At a suitable distance from the main catch b toward the other end of the shackle another catch o, projecting from the opposite side or back of the shackle, is formed therein as a withdrawal-resisting catch, and embossed stop-guards f' are located near and opposed to the free end of the catch last named. (Compare Figs. 23, 24, and 25.) The other end of the shackle may be and preferably is identical with either end of the shackle A of said first species—that is to say, provided with a catch-hole a near the extremity d of the shackle end and with embossed guards f adjacent thereto—and the shackle may be made with or without any preferred lettering or distinguishing-marks "A. B. R. R. Co." and "47894." The body part 1 and face-plate 3 of said last species may be and preferably are identical with those of the first species. The seal part B' as a whole differs from that of the first species in that it is without any middle piece until the shackle end first described is inserted, as in Fig. 24. This is done at the factory, and the withdrawal-resisting catch o, interlocking with one of the inwardly-projecting lips j at the inlet-hole k, prevents the withdrawal of the shackle and adapts the seal as a whole to be handled as one piece preliminary to the sealing operation. At the sealing operation the free end of the shackle is passed through a pair of car-door staples C, Fig. 24, or their equivalent and is then inserted through the inlet-hole k of the seal part B' and becomes interlocked with the main catch b and supplemental catches c within the seal part, as in Fig. 25, which completes the fastening operation.

The original ends of the shackle may be indicated by printing or otherwise, as well as by embossed guards. Inlet-guards of other forms may be used, especially in those species, Figs. 16 to 22, inclusive, where only one shackle end is inserted into the seal part. Such guards may be wholly omitted with as much safety as in any other snap-seal, and other like modifications will suggest themselves to those skilled in the art.

The term "catch-hole" is used generically to include, with the catch-holes a so described, the equivalent catch-loops a² and a³ or either of the latter.

Having thus described said improvement, I claim as my invention and desire to patent under this specification—

1. An improved snap-seal composed of a flexible shackle having one end secured in any suitable manner and provided at its other end with a catch-hole near its extremity, and a hollow sheet-metal seal part having an inlet-hole to receive the shackle end last named;

one of the parts being further provided with a double snap-catch integral with such part, inclosed within said seal part, and comprising a main catch arranged to interlock with said catch-hole and a pair of supplemental catches arranged to interlock with the extremity of the shackle end containing said catch-hole and to prevent its disengagement from said main catch, each of said catches tapering toward its free end and the whole being adapted to be formed by a single incision.

2. An improved snap-seal composed of a flexible shackle having one end secured in any suitable manner and provided at its other end with a catch-hole near its extremity, and a hollow sheet-metal seal part having an inlet-hole to receive the shackle end last named; one of the parts being further provided with a double catch integral with such such part, inclosed within said seal part, and comprising a main catch arranged to interlock with said catch-hole and a pair of supplemental catches arranged to interlock with the extremity of the shackle end containing said catch-hole and to prevent its disengagement from said main catch, each of said catches tapering toward its free end and the whole being adapted to be formed by a single M-shaped incision.

3. In a snap-seal, in combination with a flexible shackle having one end secured in any suitable manner and its other end provided with a catch-hole near its extremity, a hollow sheet-metal seal part composed of body and cap pieces permanently interlocked with each other by a circumferential joint, and an interposed flat middle piece, of spring metal, fixedly held by its edges in said joint, and provided with a double snap-catch comprising a main catch arranged to interlock with said catch-hole at the fastening operation and resist the withdrawal of the fastened shackle end and a pair of supplemental catches at the sides of the free end of said main catch adapted to interlock with the extremity of said fastened shackle end and prevent its disengagement from said main catch.

4. In a snap-seal, in combination with a flexible shackle having one end secured in any suitable manner and its other end provided with a catch-hole near its extremity, a hollow sheet-metal seal part composed of body and cap pieces permanently interlocked with each other by a circumferential joint, and an interposed flat middle piece of spring metal fixedly held by its edges in said joint and provided with a double snap-catch comprising a main catch and a pair of supplemental catches integral with the body of said middle piece and formed by making an incision in the latter and by bending the respective catches into effective position, said main catch being arranged to interlock with said catch-hole and to resist the withdrawal of the fastened shackle end, and said supplemental catches adapted to interlock with the extremity of the fastened shackle end and to prevent its disengagement from said main catch.

5. In a snap-seal, in combination with a flexible shackle having one end secured in any suitable manner and its other end provided with a catch-hole near its extremity, a hollow sheet-metal seal part composed of body and cap pieces permanently interlocked with each other by a circumferential joint, and an interposed flat middle piece of spring metal fixedly held by its edges in said joint and provided with a double snap-catch comprising a main catch and a pair of supplemental catches integral with the body of said middle piece and formed by making an M-shaped incision in the latter and by bending the respective catches into effective position, said main catch being arranged to interlock with said catch-hole and to resist the withdrawal of the fastened shackle end, and said supplemental catches adapted to interlock with the extremity of the fastened shackle end and to prevent its disengagement from said main catch.

6. The combination, in a snap-seal, of a flexible shackle having each of its ends provided with a catch-hole near its extremity, and a hollow sheet-metal seal part composed of a body-piece and a cap-piece permanently interlocked with each other by a circumferential joint and a flat middle piece of spring metal fixedly held by its edges in said joint and provided with a main catch, arranged to interlock with the catch-hole of each shackle end and to prevent the withdrawal of said shackle ends, and a pair of supplemental catches at the sides of the free end of said main catch, arranged to interlock with the extremity of each shackle end and to prevent the disengagement of the shackle ends or either of them from said main catch, substantially as hereinbefore specified.

EDWARD J. BROOKS.

Witnesses:
ELINOR BROOKS,
ELLEN J. BROOKS.